United States Patent
Lengyel et al.

(10) Patent No.: US 7,220,040 B2
(45) Date of Patent: May 22, 2007

(54) LED LIGHT ENGINE FOR BACKLIGHTING A LIQUID CRYSTAL DISPLAY

(75) Inventors: John Michael Lengyel, Malabar, FL (US); Jonathan Frank Holmes, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 195 days.

(21) Appl. No.: 10/988,334

(22) Filed: Nov. 12, 2004

(65) Prior Publication Data

US 2006/0104090 A1    May 18, 2006

(51) Int. Cl.
    *F21V 7/04* (2006.01)
(52) U.S. Cl. .................. 362/612; 362/633
(58) Field of Classification Search ........... 362/612, 362/608, 633
    See application file for complete search history.

(56) References Cited

U.S. PATENT DOCUMENTS

| | | | | |
|---|---|---|---|---|
| 4,173,035 A * | 10/1979 | Hoyt | ............. | 362/249 |
| 5,375,043 A * | 12/1994 | Tokunaga | ............. | 362/601 |
| 5,559,681 A * | 9/1996 | Duarte | ............. | 362/252 |
| 5,639,158 A | 6/1997 | Sato | ............. | 362/247 |
| 5,727,862 A | 3/1998 | Wu | ............. | 362/27 |
| 5,973,923 A * | 10/1999 | Jitaru | ............. | 361/704 |
| 6,036,328 A * | 3/2000 | Ohtsuki et al. | ............. | 362/612 |
| 6,057,597 A * | 5/2000 | Farnworth et al. | ............. | 257/710 |
| 6,115,016 A * | 9/2000 | Yoshihara et al. | ............. | 345/88 |
| 6,134,092 A * | 10/2000 | Pelka et al. | ............. | 361/31 |
| 6,234,645 B1 | 5/2001 | Borner et al. | ............. | 362/231 |
| 6,283,612 B1 * | 9/2001 | Hunter | ............. | 362/240 |
| 6,445,139 B1 | 9/2002 | Marshall et al. | ............. | 315/291 |
| 6,521,879 B1 | 2/2003 | Rand et al. | ............. | 250/205 |
| 6,719,436 B1 | 4/2004 | Lin et al. | ............. | 362/31 |
| 6,731,077 B1 | 5/2004 | Cheng | ............. | 315/291 |
| 6,744,416 B2 * | 6/2004 | Mizutani et al. | ............. | 345/88 |
| 6,798,133 B1 * | 9/2004 | Ambrugger et al. | ............. | 313/498 |
| 6,882,111 B2 * | 4/2005 | Kan et al. | ............. | 315/122 |
| 6,930,737 B2 * | 8/2005 | Weindorf et al. | ............. | 349/96 |
| 7,118,251 B1 * | 10/2006 | Chambers et al. | ............. | 362/311 |
| 2003/0223235 A1 * | 12/2003 | Mohacsi et al. | ............. | 362/240 |
| 2004/0004827 A1 * | 1/2004 | Guest | ............. | 362/31 |
| 2005/0157500 A1 * | 7/2005 | Chen et al. | ............. | 362/294 |

* cited by examiner

*Primary Examiner*—Ali Alavi
*Assistant Examiner*—Hargobind S. Sawhney
(74) *Attorney, Agent, or Firm*—GrayRobinson, P.A.

(57) ABSTRACT

An edge-lit backlighting system for liquid crystal displays employs a number of light strips in the form of thin, light weight sections of a thermally conductive substrate each of which mounts a plurality of light engines having an array of densely packed, primary color light emitting diodes, which, when collectively illuminated, produce a white light of desired reference white chromaticity.

6 Claims, 4 Drawing Sheets

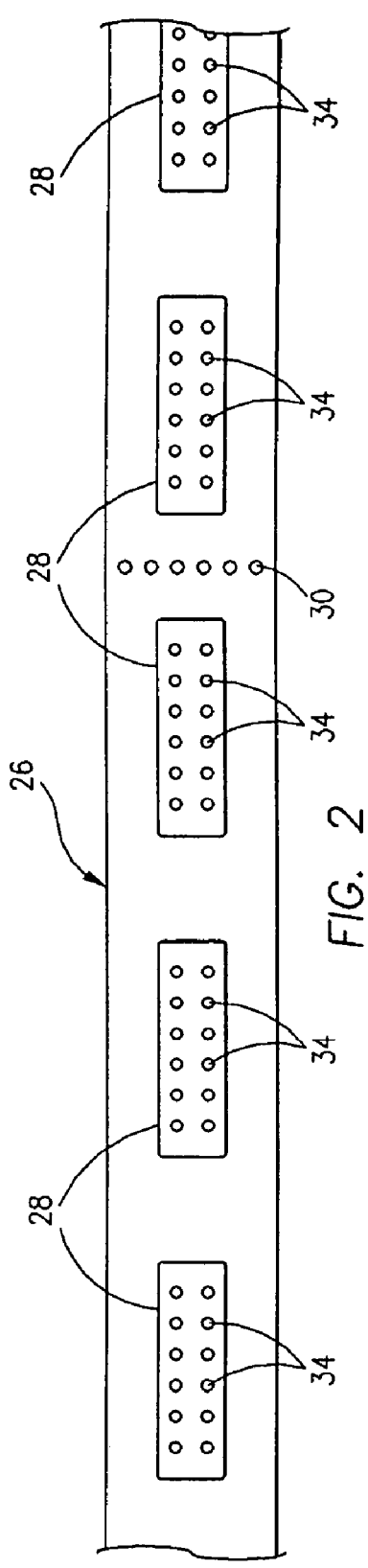
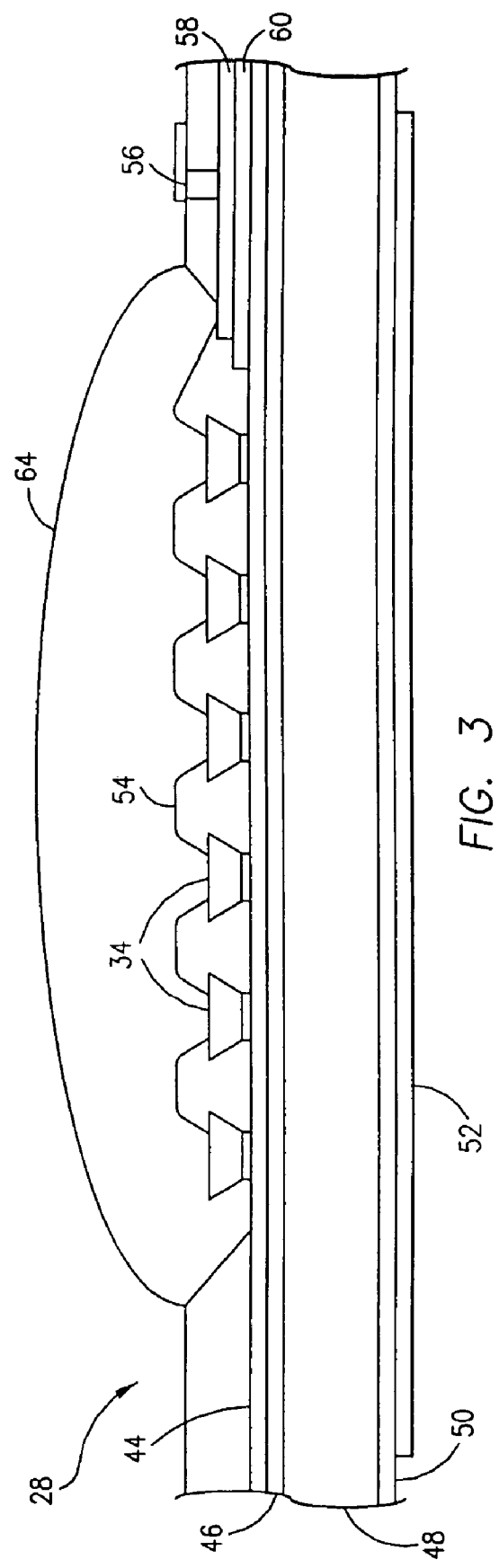

LED LIGHT ENGINE FOR BACKLIGHTING A LIQUID CRYSTAL DISPLAY

FIELD OF THE INVENTION

This invention is directed to an edge-lit backlighting system for liquid crystal displays, and, more particularly, to a backlighting system employing a number of light strips in the form of thin, light weight sections of a thermally conductive substrate each of which mounts a plurality of light engines having an array of densely packed, primary color light emitting diodes ("LEDs") which, when collectively illuminated, produce a white light of desired reference white chromaticity.

BACKGROUND OF THE INVENTION

Liquid Crystal Displays ("LCDs") are the technology of choice for avionics displays and a number of other applications. Among the advantages of LCDs are: they conserve weight and space, have simple electrical interfaces, are capable of preserving contrast for sunlight viewing with appropriate enhancements, can be made sufficiently rugged to withstand difficult mechanical and environmental conditions, can be made to operate over extreme temperatures and can be made compatible with night vision imaging systems. The LCD is a transmissive device; as such, it requires a source of rear illumination (backlight) to render the intended image. Each of the subassemblies of the overall system, e.g. LCD and backlight, shoulder different responsibilities in the integrated system. Some performance attributes are shared, while others are unique to each subassembly. As such, design considerations for each subassembly must be friendly to the other to ensure the integrated system can accommodate the rigor of the intended application.

Currently, the most popular method of back-illuminating an LCD is to use a serpentine fluorescent lamp in a reflecting housing with a heavy diffuser overlying the lamp to provide balanced luminance. The serpentine fluorescent lamp is mounted in a frame or housing having a reflecting surface, and a diffuser panel or sheet is then placed between the lamp and LCD. An alternative arrangement is the so-called "edge-lit" backlight subassembly which employs one or more thin, elongated fluorescent lamps each mounted along a side edge of a light guide. A sheet or film of reflective material is located on one side of the light guide, and one or more enhancement films such as light diffusers or Brightness Enhancement Films (BEF) are positioned on the opposite side of the light guide in between it and the LCD. When the fluorescent lamp(s) are illuminated, the light guide transmits and directs the light toward the enhancement films to illuminate the LCD.

Backlight subassemblies of the type described above are considered the "weak link" which can compromise the optical performance, environmental performance, and life expectancy of LCDs systems in many applications. This is principally due to shortcomings of the fluorescent lamps. Although an effective means of producing visible light, fluorescent lamps have a number of deficiencies which present difficulties when employed in backlighting subassemblies. Fluorescent lamps have poor reliability and poor efficiency when used in a backlight system. It is estimated that as much as 75% of the theoretical maximum luminance is lost with fluorescent lamp backlights. Fluorescent lamp backlights are not mechanically robust, they are difficult to dim, they are difficult to start at cold temperature and have significantly reduced light output at both high and low temperatures. The color gamut of fluorescent backlights is reduced as compared to LEDs, for example, and reduced color gamut of the light which illuminates the LCD reduces image fidelity. Serpentine fluorescent lamps have a relatively deep profile which increases the overall weight and size of the LCD system, making it less than desirable in some applications. Further, fluorescent lamps of all types contain mercury which presents a disposal issue when the lamps are replaced.

A color display is an additive color system. It takes at least one red, green and blue sub-pixel to make a white light color group. The white light color group is commonly referred to as a pixel. In an LCD, there are discreet color filters, e.g., red, green and blue, resident at each sub-pixel. These filters subtract unwanted wavelengths of light from the aggregate white-light backlight to produce the desired color. With the relatively recent (circa 1997) development of blue LEDs, considering that red and green LEDs were already in existence, the LED has been suggested as a replacement for fluorescent lamps in backlight systems as discussed, for example, in U.S. Pat. Nos. 5,727,862 and 6,719,436. The LED produces light when electrons flow across a P—N junction doped with the proper light-emitting compound. Whereas phosphor chemistry employed in the manufacture of fluorescent lamps is a mature science, LED chemistry is still in its infancy and significant gains in efficiency compared to fluorescent lamps, perhaps on the order of 200%, are expected in the coming years.

There are three competing configurations for generating white light using LEDs. These include an assembly which mounts discrete red, green and blue LEDs immediately adjacent to one another so that when they are collectively illuminated white light is produced, an ultraviolet LED coated with a red, green and blue phosphor coating, and, a blue LED coated with a yellow phosphor coating. To enhance the images produced by an LCD, the backlight spectra should produce emission peaks for the red, green and blue emission bands which match the peak transmission of the color filters on the LCD. The latter two approaches for producing white light noted above perform relatively poorly in that respect. Although improved performance can be obtained with an assembly which combines red, green and blue LEDs, the question has been how clusters or assemblies of such primary color LEDs can be efficiently and effectively incorporated into a backlight system to obtain the desired physical and other performance parameters, e.g. size, weight, durability, luminance, intensity, color gamut etc.

SUMMARY OF THE INVENTION

This invention is directed to a an edge-lit backlighting subassembly for use with a LCD system which employs a multiplicity of primary color LEDs densely packed along a thin, elongated strip which can be broken or cut to a desired lengths and placed about the edges of the backlighting subassembly. The LEDs are chosen so that when they are collectively illuminated a white light of desired reference white chromaticity is produced with excellent color gamut. A heat transfer structure is provided to remove heat from the area of the LEDs.

In the presently preferred embodiment, a plurality of light engines each including an array of densely packed primary color LEDs are mounted at spaced intervals to a thermally conductive substrate such as a printed wiring board (PWB). The LEDs are preferably hosted on the light engine by a low temperature co-fired ceramic material having a metal heat spreader. In one embodiment, each light engine has two or more parallel legs consisting of several LEDs, and the LEDs in each leg are connected in series. The number of LEDs, and their respective colors, e.g., red, green or blue, are chosen to produce white light of desired reference white chromaticity. In an alternative embodiment, three arrays of LEDs are provided on each light engine, with the same color LEDs (red, green or blue) being grouped in respective arrays. A forward voltage and current is applied to the LEDs in each array which is separately controlled to permit independent variation of the intensity of the red, green or blue light produced by the different arrays. In either embodiment, when the LEDs are collectively illuminated, the resulting white light is transmitted to a light guide, which, in turn, transmits the light through one or more enhancement films to the LCD subassembly of the overall system.

In order to enhance the transmission of light between the light engines and the light guide, a reflective sheet is provided having an upturned, peripheral edge formed with a number of spaced apertures. Each aperture receives the cluster of LEDs on one of the light engines, and covers the spaces along the PWB between adjacent light engines. This prevents the white light collectively emitted from the LEDs from being absorbed by the PWB, or escaping in the area of the interface between the light engines and light guides, thus enhancing the overall efficiency of the backlight subassembly.

Heat transfer structure is provided to dissipate the heat produced by the LEDs on the light engines. As noted above, the LEDs are hosted on the light engines by a low temperature co-fired ceramic or similar material which mounts a metal heat spreader. Each light engine, in turn, is mounted by an interface material formed of silver and palladium, or a similar conductor, to the PWB. The PWB carries at least one conductive strip or plate, such as copper, which extends in a longitudinal direction along its length. Additionally, a number of via, also formed of copper or the like, extend in the perpendicular direction between the light engine on one side of the PWB and the opposite surface of the PWB. The PWB is then connected to a heat exchanger by a layer of flexible, heat conductive material which forms a seal at the interface of both the PWB and heat exchanger. The aforementioned structure collectively provides a path for the transfer of heat from the area of the LEDs to the heat exchanger, which, in turn, can be mounted to other heat conductive structure within which the system is housed to further dissipate heat.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 2 is a schematic view of a portion a light strip mounting a number of spaced light engines;

FIG. 3 is a side view of a light engine depicting one form of LED suitable for use in this invention;

DETAILED DESCRIPTION OF THE INVENTION

Figure 1:
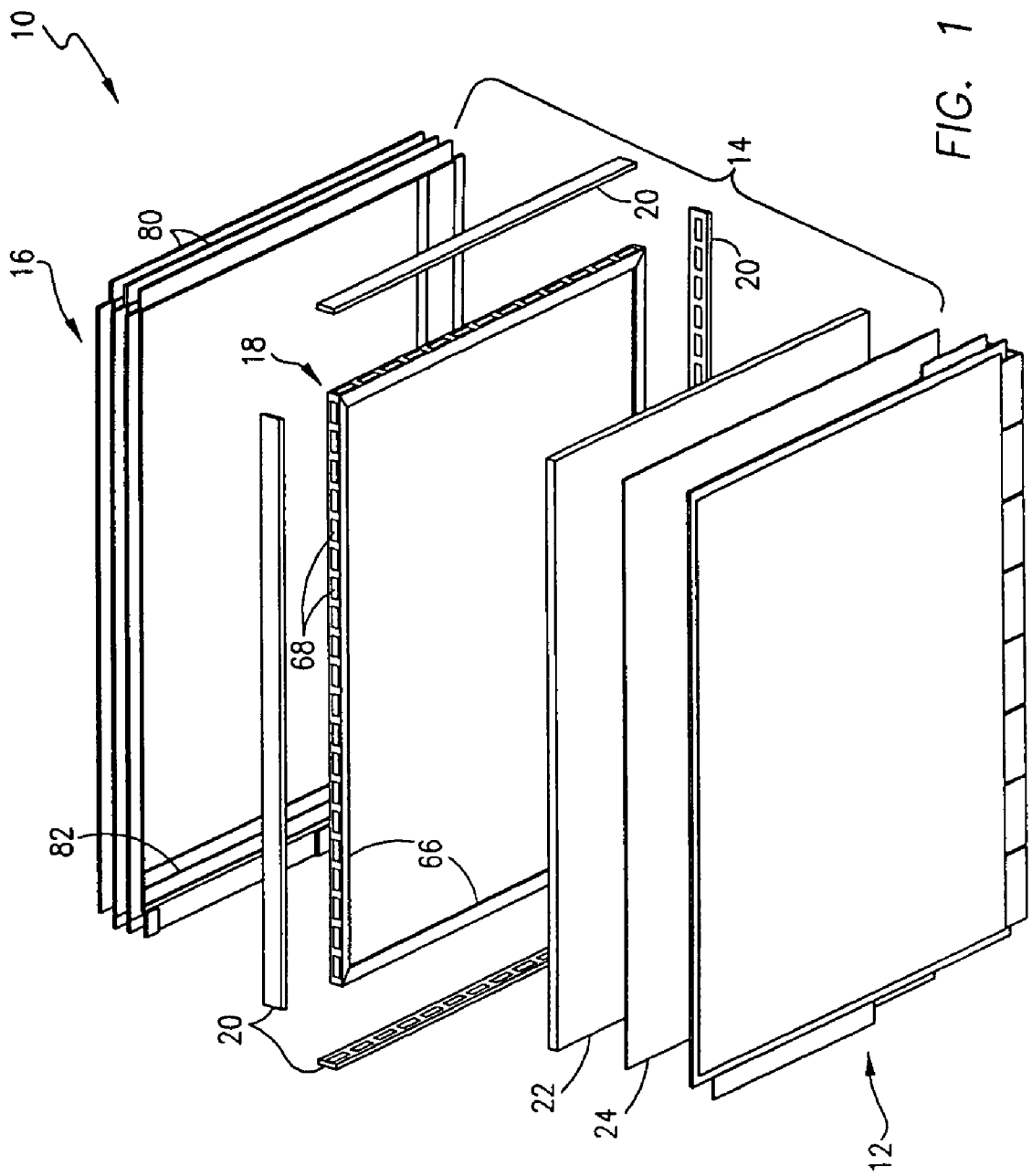
FIG. 1 is an exploded, perspective view of a display system including an LCD subassembly and a backlighting subassembly.

Referring initially to FIG. 1, the light system 10 of this invention comprises an LCD subassembly 12 and a backlighting subassembly 14. The backlighting subassembly 14 collectively includes a heat exchanger 16, a light reflective sheet 18, a number of light strips 20, a light guide 22 and at least one light enhancement film 24. The detailed construction of the LCD subassembly 12, the heat exchanger 16, the light guide 22 and the light enhancement film 24 forms no part of this invention and is therefore not discussed herein. The structure and operation of the light strips 20 is described first, followed by a discussion of their connection to the light reflective sheet 18 and how the entire light system 10 is assembled.

As best seen in FIGS. 2 through 5, each of the light strips 20 comprises a thermally conductive substrate such as a printed wiring board (PWB) 26 formed in an elongated strip which mounts a number of longitudinally spaced light engines 28. Preferably, the PWB 26 has perforations 30 or other lines of weakness at intervals along its length where the PWB 26 may be broken or cut to form a strip of a desired length. It is contemplated that the PWB 26 with the light engines 28 will be formed in long rolls or the like for ease of transport and handling, and then separated along the perforations 30 to a desired length depending upon the physical size of a particular LCD subassembly 12.

Figure 4:
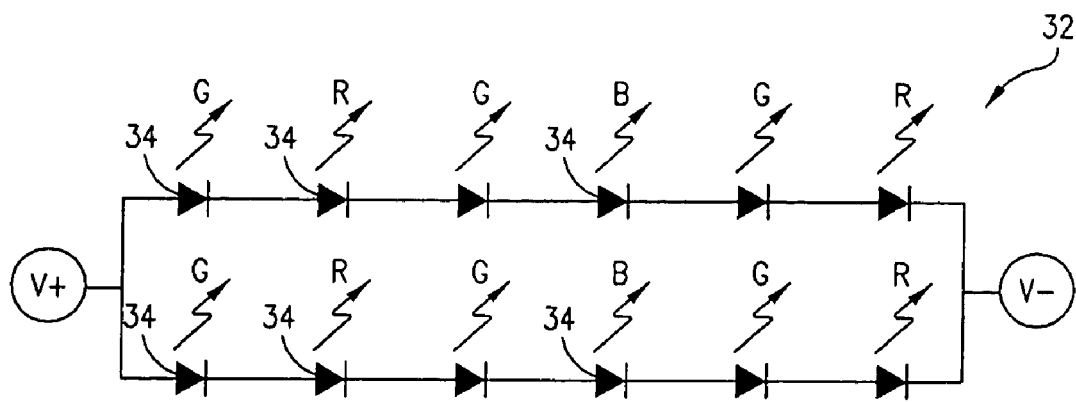
FIG. 4 is a schematic view of one arrangement of an array of LEDs of a light engine employed herein.
Figure 5:
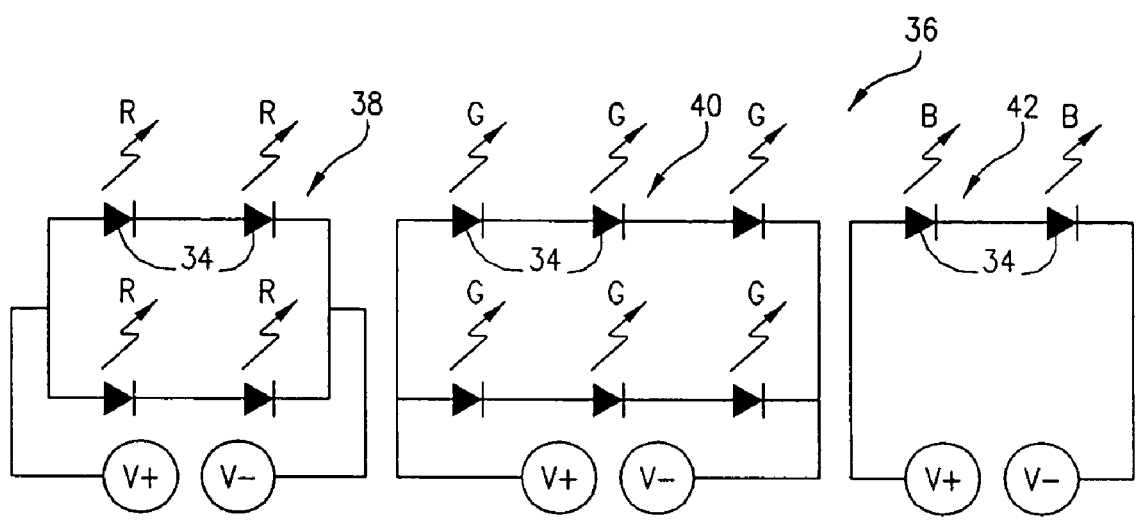
FIG. 5 is a view similar to FIG. 4, except of an alternative LED array.

Each light engine 28 includes a clustered array 32 of primary color LEDs 34, e.g. red, green and blue, as depicted by the corresponding letters in FIGS. 4 and 5. In the embodiment shown in FIGS. 2 and 4, each array 32 consists of two parallel legs of six LEDs 34 connected in series within each leg. To obtain a white light having a reference white chromaticity of 5400 Kelvins, for example, a combination of three green LEDs 34, two red LEDs 34 and one blue LED 34 is employed in each parallel leg of an array 32. It should be understood that the number of parallel legs and LEDs 34 in each array 32, and the particular combination of primary color LEDs 34 selected, may be varied as desired to obtain a white light of desired reference white chromaticity when the LEDs are collectively illuminated. Further, the LEDs 34 can be connected in series with no parallel legs, if desired. The arrangement depicted in FIGS. 2 and 4 is therefore provided for purposes of illustration only, and is not intended to limit the scope of this invention.

In the alternative embodiment illustrated in FIG. 5, an array 36 of LEDs 34 is shown which consists of three groups 38, 40 and 42 of four red, six green and two blue LEDs 34, respectively. The red and green LEDs 34 in groups 38 and 40 are arranged in parallel legs with the LEDs 34 in each leg being connected in series. The two blue LEDs 34 in group 42 are also connected in series. As schematically depicted, a voltage is applied to each group 38, 40 and 42 of LEDs 34 which is separately controlled to permit independent variation of the intensity of red, green or blue light produced by the respective groups 38, 40 and 42. Consequently, white light having a wide range of reference white chromaticity may be obtained from the array 36 illustrated in FIG. 5 by simply adjusting the current applied to each group 38, 40 and 42 within an array 36. This adds to the versatility of the backlighting subassembly 14 of this invention, making it readily adaptable for use with LCD subassemblies 12 produced by different manufacturers.

The detailed construction of a light engine 28 is best seen in FIG. 3. One type of LED 34 is shown in FIG. 3 for purposes of illustration, but it is contemplated that others may be employed so long as they are available in red, green and blue. The LEDs 34 are hosted by a low temperature co-fired ceramic or similar layer 44 connected to a metal heat spreader 46, preferably in the form of a plate made of copper or the like. A layer 48 of molybdenum is sandwiched between the heat spreader 46 and a lower copper plate 50, which, in turn, is connected to a bottom layer 52 preferably formed of silver/palladium. As schematically shown in FIG. 3, adjacent LEDs 34 are electrically connected by an aluminum wire band 54, although other suitable means of connection may be used. One end of the wire band 54 connects to a silver via 56 which mounts to a layer 58 of silver material or the like resting atop a dielectric layer 60. A clear layer or dome 64 of low temperature glass ceramic or similar material encases the LEDs 34 on each light engine 28 on the PWB 26, as shown.

Figure 6:
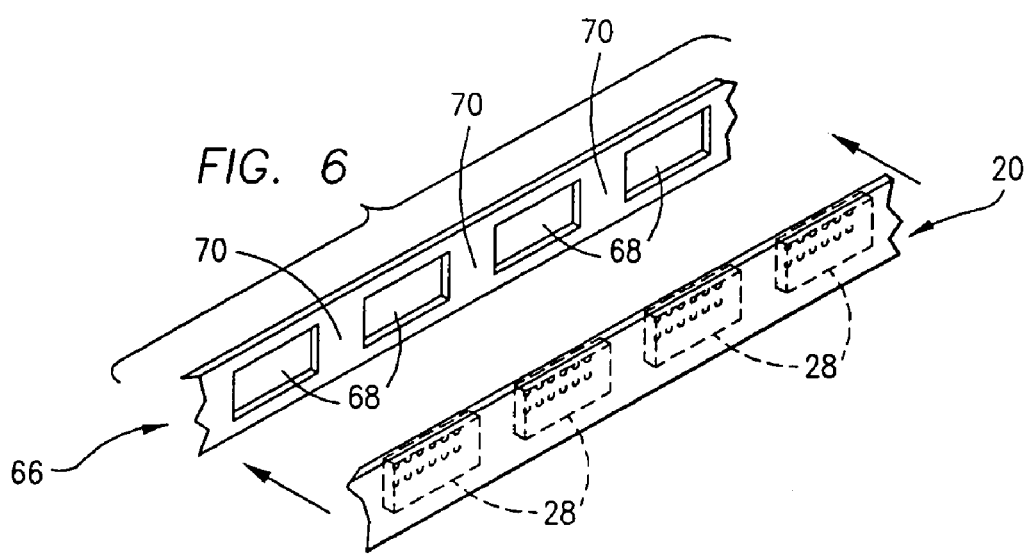
FIG. 6 is a schematic, disassembled view showing the connection between the light engines on the light strip and apertures formed in the upturned, peripheral edge of the light reflective sheet.

As noted above, the backlighting subassembly 14 of this invention is an edge-lit system wherein white light from the light strips 20 is directed to the sides of the light guide 22 which then transmits and directs the light toward the LCD subassembly 12. In order to increase overall efficiency of the system 10, it is desirable to minimize the loss of light produced by the light engines 28 which can occur as a result of absorption or escape in directions other than toward the side edges of the light guide 22. Referring to FIGS. 1 and 6, the light reflective sheet 18 is preferably formed with an upturned peripheral edge 66 extending along all four sides. The upturned peripheral edge 66 has a number of spaced apertures 68, with a section 70 of the reflective sheet located in between adjacent apertures 68.

Preferably, a total of four light strips 20 are employed, one for each side of the light guide 22, although either less or more than four light strips 20 may be utilized. The light strips 20 are connected to the light reflective sheet 18 by inserting the dome 64 which encases the LEDs 34 on each light engine 28 into an aperture 68 in the upturned edge 66 of the light reflective sheet 18. Each of the apertures 68 is sized to snugly receive the dome 64 of a light engine 28, and the width of the section 70 of the reflective sheet in between the apertures 68 extends from an edge of one light engine 28 to the edge of the adjacent light engine 28. This arrangement prevents light produced by the LEDs 34 from escaping along the top or bottom of the light strips 20 at the juncture with the light guide 22. Further, the spaces along the PWB 26 in between adjacent light engines 28 is covered by the sections 70 of the reflective sheet so that virtually no light from the LEDs 34 is absorbed by the PWB 26. The result is an efficient transfer of light produced by the light engines 28 to the side edges of the light guide 22.

Figure 7:
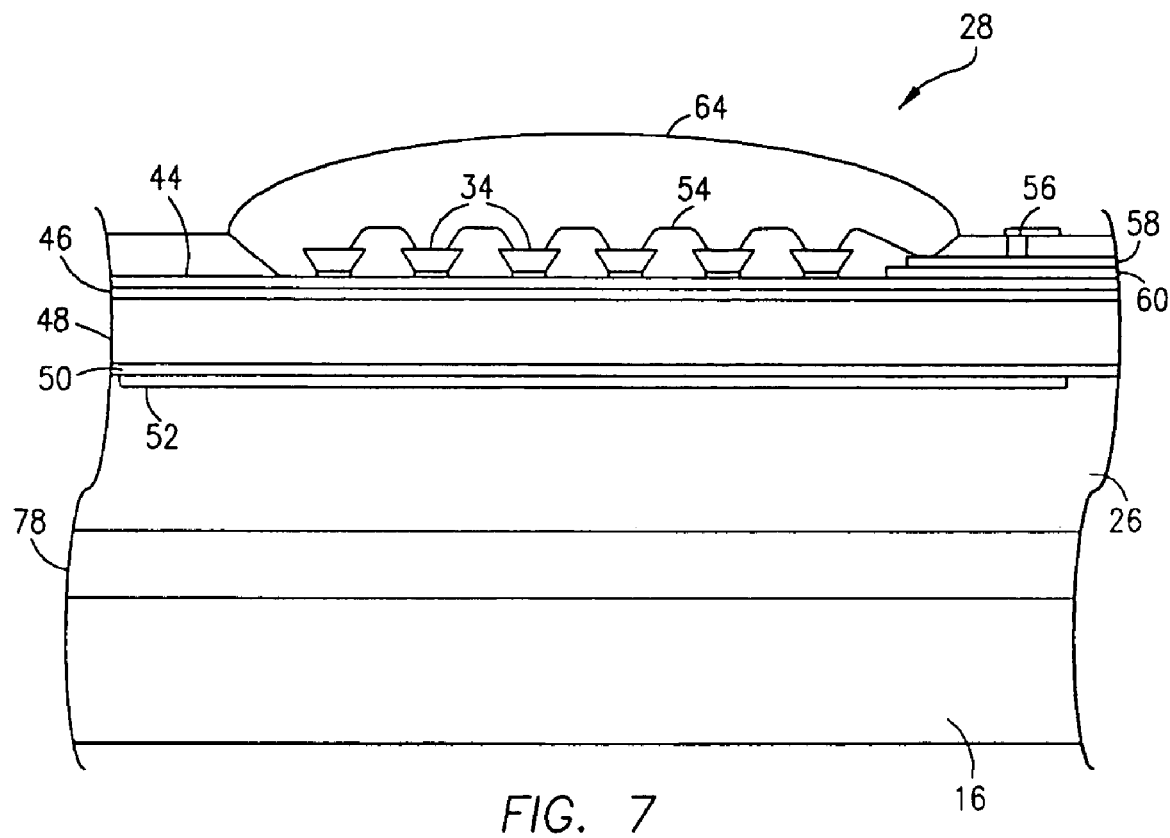
FIG. 7 is a side view of the heat transfer structure of this invention.
Figure 8:
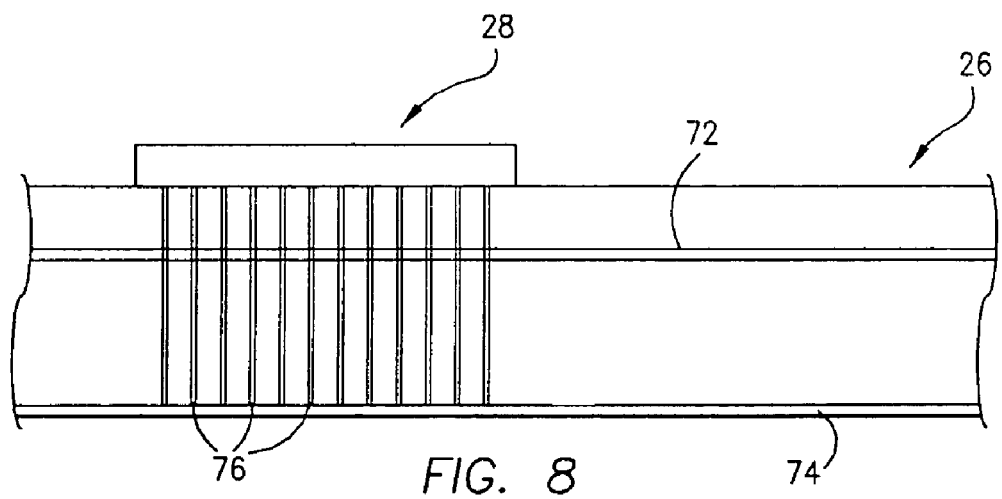
FIG. 8 is an enlarged, cross sectional view of the printed wiring board which mounts the light engines.

Another aspect of this invention relates to the structure provided to transfer heat away from the area of the LEDs 34 and light engines 28. Referring now to FIGS. 7 and 8, as previously discussed the LEDs 34 on each light engine 28 are hosted by the low temperature co-fired ceramic or similar layer 44 which is connected to the metal heat spreader 46. Heat is transferred from this location through the molybdenum layer 48 and copper plate 50 to the bottom layer 52 of the light engine 28 which is soldered or otherwise affixed to the PWB 26. In the presently preferred embodiment, the PWB 26 has two, vertically spaced metal plates 72 and 74 which extend longitudinally along the length of the PWB 26. A plurality of via 76, preferably formed of copper, extend vertically through the PWB 26 from its top surface to the bottom beneath each one of the light engines 28. For purposes of discussion, the terms "horizontal," "vertical," "top" and "bottom" refer to the corresponding directions in the orientation of the PWB 26 shown in FIGS. 7 and 8. A layer 78 of flexible thermal material is then sandwiched in between the bottom of the PWB 26 and heat exchanger 16. The layer 78 has adhesive material on both sides to adhere to both the PWB 26 and heat exchanger 16, and is sufficiently flexible to conform to the shape of those surfaces and form a seal. One type of thermal material which may be used for layer 78 is commercially available from the Parker Seals Company under the name "Therm-A-Gap." As noted above, the detailed structure of the heat exchanger 16 forms no part of this invention and is therefore generically depicted as a section of heat conductive metal, such as aluminum, having fins 80. See also FIG. 1. An efficient heat transfer path is therefore provided from each light engine 28 through the PWB 26 and thermal material layer 78 to the heat exchanger 16. The heat exchanger 16, in turn, may be mounted to other structure in which the system 10 is housed to provide for additional heat transfer, if desired.

In order to assemble the system 10, four light strips 20 are mounted to the light reflective sheet 18 in the manner noted above, and they are received within a seat 82 formed in the heat exchanger 16. The light guide 22 and light enhancement film(s) 24 are also received within the seat 82, with the film(s) 24 overlying the light guide 22, and a clip (not shown) or other attachment holds such elements in place within the heat exchanger 16 forming the completed backlighting subassembly 14. The LCD subassembly 12 is then mounted to outside of the heat exchanger 16, in a position overlying the backlighting subassembly 14, to complete the system 10.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An edge-lit backlighting system for use with a liquid crystal display, comprising:
   a heat exchanger;
   at least one light strip including a plurality of light engines mounted at spaced intervals therealong, each of said light engines including a plurality of primary color light emitting diodes, said light emitting diodes being selected so that when illuminated the primary color light emitted therefrom is combined to collectively produce a white light of desired reference white chromaticity;
   a separate protective casing for enclosing said light emitting diodes on each of said light engines, each of said protective casings protruding from the surface of said light engine;

a light guide mounted in position to receive said white light produced by said at least one light strip;

a light reflective sheet coupled to said at least one light strip, said light reflective sheet and said at least one light strip being mounted to said heat exchanger, said light reflective sheet having an upturned, peripheral edge formed with a plurality of spaced apertures, each of said apertures receiving one of said protective casings of a light engine to permit the transmission of white light to said light guide while said space along said at least one light strip between adjacent light engines is covered by said reflective sheet; and at least one enhancement film overlying said light guide.

2. The system of claim 1 in which said at least one light strip includes a thermally conductive substrate formed in an elongated strip, said plurality of light engines being coupled to said elongated strip.

3. The system of claim 2 in which said elongated strip is a printed wiring board, said printed wiring board being formed with at least one metal heat spreader and a number of thermally conductive via, each of said light engines coupled to said elongated strip being positioned in thermal communication with said via.

4. The system of claim 3 in which said printed wiring board is formed with lines of weakness at intervals therealong in between said light engines, said printed wiring board being breakable at each of said lines of weakness to allow for the formation of a shortened strip of desired length.

5. The system of claim 3 further including a layer of thermally conductive material connected between said printed wiring board and said heat exchanger, said layer being flexible to form a seal at said printed wiring board and at said heat exchanger.

6. The system of claim 1 in which each of said protective casing is a clear section of low temperature glass ceramic material.

* * * * *